(12) United States Patent
Friedley et al.

(10) Patent No.: US 11,409,673 B2
(45) Date of Patent: Aug. 9, 2022

(54) TRIGGERED OPERATIONS FOR COLLECTIVE COMMUNICATION

(71) Applicant: Intel Corporation, Santa Clara, CA (US)

(72) Inventors: Andrew Friedley, Livermore, CA (US); Sayantan Sur, Portland, OR (US); Ravindra Babu Ganapathi, Hillsboro, OR (US); Travis Hamilton, Austin, TX (US); Keith D. Underwood, Powell, TN (US)

(73) Assignee: Intel Corporation, Santa Clara, CA (US)

( * ) Notice: Subject to any disclaimer, the term of this patent is extended or adjusted under 35 U.S.C. 154(b) by 654 days.

(21) Appl. No.: 16/275,625

(22) Filed: Feb. 14, 2019

(65) Prior Publication Data
US 2019/0179779 A1    Jun. 13, 2019

(51) Int. Cl.
G06F 13/38 (2006.01)
G06F 13/16 (2006.01)
G06F 9/48 (2006.01)
G06F 12/0802 (2016.01)

(52) U.S. Cl.
CPC ........ *G06F 13/1668* (2013.01); *G06F 9/4881* (2013.01); *G06F 12/0802* (2013.01); *G06F 2212/1008* (2013.01)

(58) Field of Classification Search
CPC ............... G06F 13/1668; G06F 9/4881; G06F 12/0802; G06F 2212/1008
See application file for complete search history.

(56) References Cited

U.S. PATENT DOCUMENTS

| | | | | |
|---|---|---|---|---|
| 6,157,977 A | * | 12/2000 | Sherlock | G06F 12/0835 370/402 |
| 7,890,708 B2 | * | 2/2011 | Barrett | G06F 13/1626 711/119 |
| 8,032,726 B2 | * | 10/2011 | Iwamura | G06F 11/2071 714/6.23 |
| 8,335,892 B1 | * | 12/2012 | Minkin | G06F 12/084 710/60 |
| 9,183,150 B2 | * | 11/2015 | Caparros Cabezas | G06F 12/0835 |
| 9,235,516 B1 | * | 1/2016 | Marshak | G06F 12/0802 |

(Continued)

OTHER PUBLICATIONS

Di Girolama Salvatore et al; "Exploiting Offload-Enabled Network Interfaces", IEEE Micro, IEEE Service Center, Los Alamitos, CA, US, vol. 36, No. 4, Jul. 1, 2016 (Jul. 1, 2016), pp. 6-17.

(Continued)

*Primary Examiner* — Cheng Yuan Tseng
(74) *Attorney, Agent, or Firm* — Compass IP Law PC

(57) ABSTRACT

Examples include a method of managing storage for triggered operations. The method includes receiving a request to allocate a triggered operation; if there is a free triggered operation, allocating the free triggered operation; if there is no free triggered operation, recovering one or more fired triggered operations, freeing one or more of the recovered triggered operations, and allocating one of the freed triggered operations; configuring the allocated triggered operation; and storing the configured triggered operation in a cache on an input/output (I/O) device for subsequent asynchronous execution of the configured triggered operation.

21 Claims, 10 Drawing Sheets

(56) References Cited

U.S. PATENT DOCUMENTS

2006/0149885 A1* 7/2006 Sistla .................... G06F 12/084
                                                    711/E12.029
2019/0042946 A1   2/2019 Sur et al.
2019/0179779 A1* 6/2019 Friedley ................ G06F 9/4881

OTHER PUBLICATIONS

Extended European Search Report for Patent Application No. 20156770.8, dated Jun. 22, 2020, 12 pages.
Keith D. Underwood, et al; "Enabling Flexible Collective Communication Offload with Triggered Operations", High Performance Interconnects (HOTI) 2011 IEEE 19th Annual Symposium on, IEEE, Aug. 24, 2011, pp. 35-42.
European First Office Action, (EP Exam Report Article 94(3) EPC), for Patent Application No. 20156770.8, dated May 20, 2022, 9 pages.

* cited by examiner

TRIGGERED OPERATIONS FOR COLLECTIVE COMMUNICATION

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright © 2019, Intel Corporation, All Rights Reserved.

TECHNICAL FIELD

Examples described herein are generally related to high performance computing (HPC) and more particularly to software management of hardware offload approaches for accelerating collective communication operations.

BACKGROUND

Some HPC interconnects include hardware offload solutions for accelerating collective communication operations (typically expressed in Message Passing Interface (MPI) or symmetric hierarchical memory (SHMEM) application programming interfaces (APIs)). Collective communication is a method of communication which involves participation of multiple processes in a HPC system. In a collective communication operation, many processes work together to move data in a specific communication pattern. For example, an "allreduce" operation takes a value from each process, performs an arithmetic operation (e.g., sum) on all the values, and returns the result to every process. An implementation of "allreduce" or other collectives can be expressed as an ordered series of data transfer and atomic operations executed on each process. Some of these operations may be performed by hardware in the HPC system, such as a network interface controller (NIC) or a switch, for example. To improve HPC system performance, software management of hardware offload solutions is desired.

DETAILED DESCRIPTION

Embodiments of the present invention include a combination of a hardware triggered operation (TO) implementation using a cache paired with a host-based software fabric library to ensure high triggered operation and cache reuse. In embodiments, both hardware and software are designed and optimized specifically for MPI-style collective communication operations. Optimizing triggered operation performance results in improved collective communication performance: lower and less varied latency particularly as the number of nodes involved increases. Collective communications are an important part of effectively all HPC applications, and performance is a core requirement for customers of HPC network products.

Figure 1:
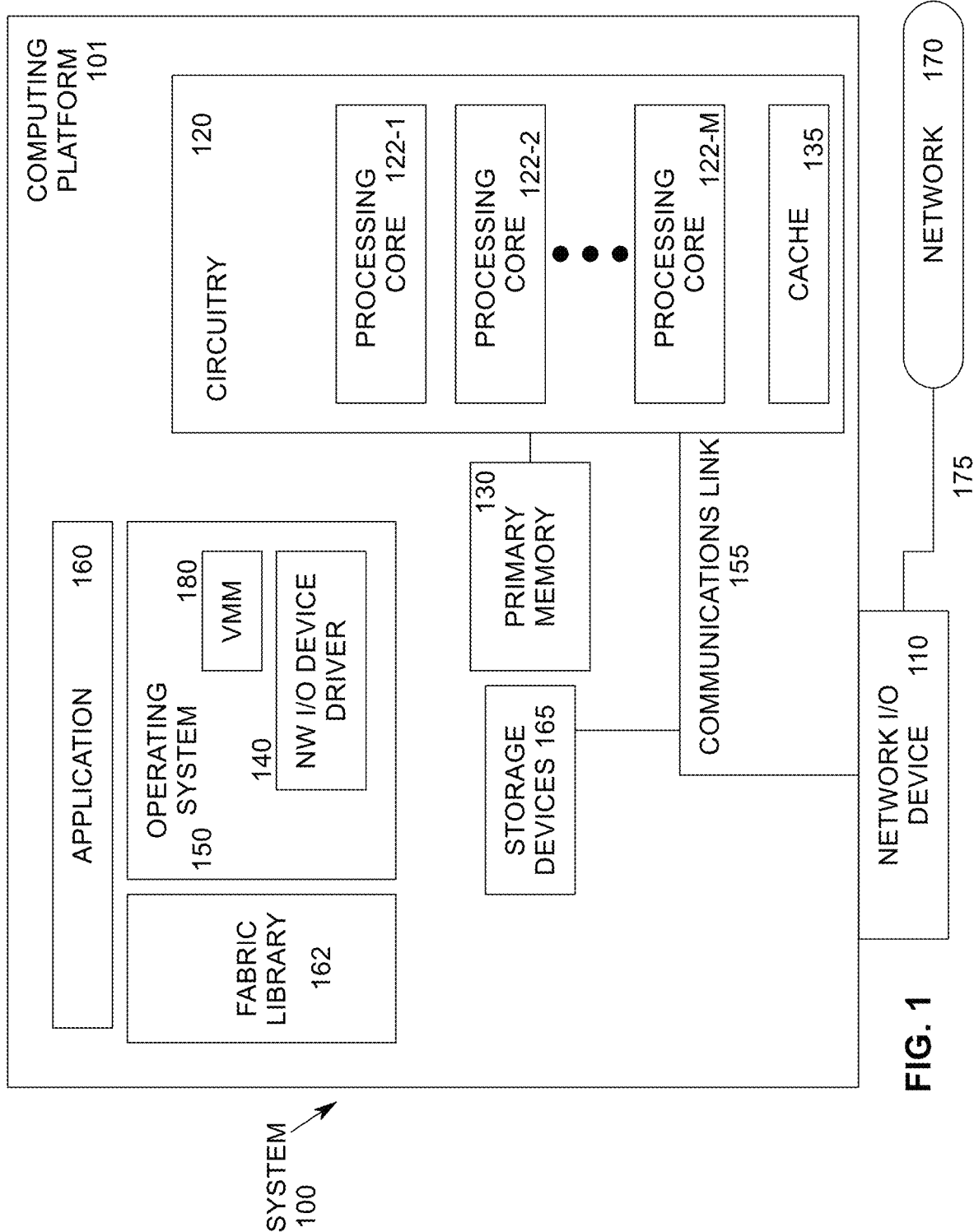
FIG. 1 illustrates an example computing system.

FIG. 1 illustrates an example computing system 100 supporting HPC. As shown in FIG. 1, computing system 100 includes a computing platform 101 coupled to a network 170 (which may be the Internet, for example, or a network within a data center). In some examples, as shown in FIG. 1, computing platform 101 is coupled to network 170 via network communication channel 175 and through at least one network I/O device 110 (e.g., a network interface controller (NIC)) having one or more ports connected or coupled to network communication channel 175. In an embodiment, network I/O device 110 is an Ethernet NIC. Network I/O device 110 transmits data packets from computing platform 101 over network 170 to other destinations and receives data packets from other destinations for forwarding to computing platform 101.

According to some examples, computing platform 101, as shown in FIG. 1, includes circuitry 120, primary memory 130, network (NW) I/O device driver 140, operating system (OS) 150, virtual machine manager (VMM) 180 (also known as a hypervisor), at least one application 160, fabric library 162, and one or more storage devices 165. In one embodiment, OS 150 is Linux™. In another embodiment, OS 150 is Windows® Server. In an embodiment, application 160 represents one or more application programs executed by circuitry 120. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a Peripheral Component Interface Express (PCIe) bus conforming to revision 4.0 or other versions of the PCIe standard. In some examples, operating system 150, NW I/O device driver 140, application 160, VMM 180, and fabric library 162 are implemented, at least in part, via cooperation between one or more memory devices included in primary memory 130 (e.g., volatile or non-volatile memory devices), storage devices 165, and elements of circuitry 120 such as processing cores 122-1 to 122-$m$, where "m" is any positive whole integer greater than 2. In an embodiment, OS 150, NW I/O device driver 140, VMM 180, application 160, and fabric library 162 are executed by one or more processing cores 122-1 to 122-$m$. In other embodiments, there are other endpoint devices coupled to communications link 155 (e.g., PCIe interconnect).

In some examples, computing platform 101, includes but is not limited to a computer server, a HPC server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, or a combination thereof. In one example, computing platform 101 is a disaggregated server. A disaggregated server is a server that breaks up components and resources into subsystems. Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, and similar processors. Circuitry 120 may include at least one cache 135 to store data.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

In an embodiment, fabric library 162 provides an API for one or more application(s) 160 to interface directly with network I/O device 110. Application 160 may call one or more functions provided by fabric library 162 to implement collective communications in computing platform 101. Fabric library 162, in at least one embodiment, communicates with network I/O device 110 to manage collective communications operations. In an embodiment, application 160 uses fabric library to manage storage in application space used for collective communications.

In an embodiment, network I/O device 110 includes a hardware implementation of triggered operations (TOs). TOs allow application 160 to queue a data transfer request that is deferred until at least one specified condition is met. A typical use is to send a message only after receiving all input data. TOs are a means of expressing an ordered series of communication and atomic operations to network I/O device 110 for asynchronous execution. Noise and jitter from OS 150 or application 160 are bypassed, resulting in faster data propagation than SW-based sending and receiving of the data between processes of computing platform 101. This offload of processing to network I/O device hardware 110 is a benefit particularly for non-blocking collectives (e.g., machine learning applications will issue many non-blocking "allreduce" collective operations simultaneously). To achieve good performance, fabric library 162 software is designed to manage and utilize triggers efficiently, particularly with regard to a cache (not shown in FIG. 1) included in network I/O device 110 for fast access to triggers. Fabric library 162 provides a mechanism for application 160 to allocate storage for collective communications. In some situations, it may be difficult to determine when allocated storage should be deallocated, and how often to communicate deallocation decisions to application 160. If deallocation decisions are communicated to application 160 too frequently, inefficient HPC system processing may result, thereby negatively impacting processing throughput.

Embodiments of the present invention overcome such difficulties by efficiently managing communications between application 160, fabric library 162 and network I/O device 110.

Figure 2:
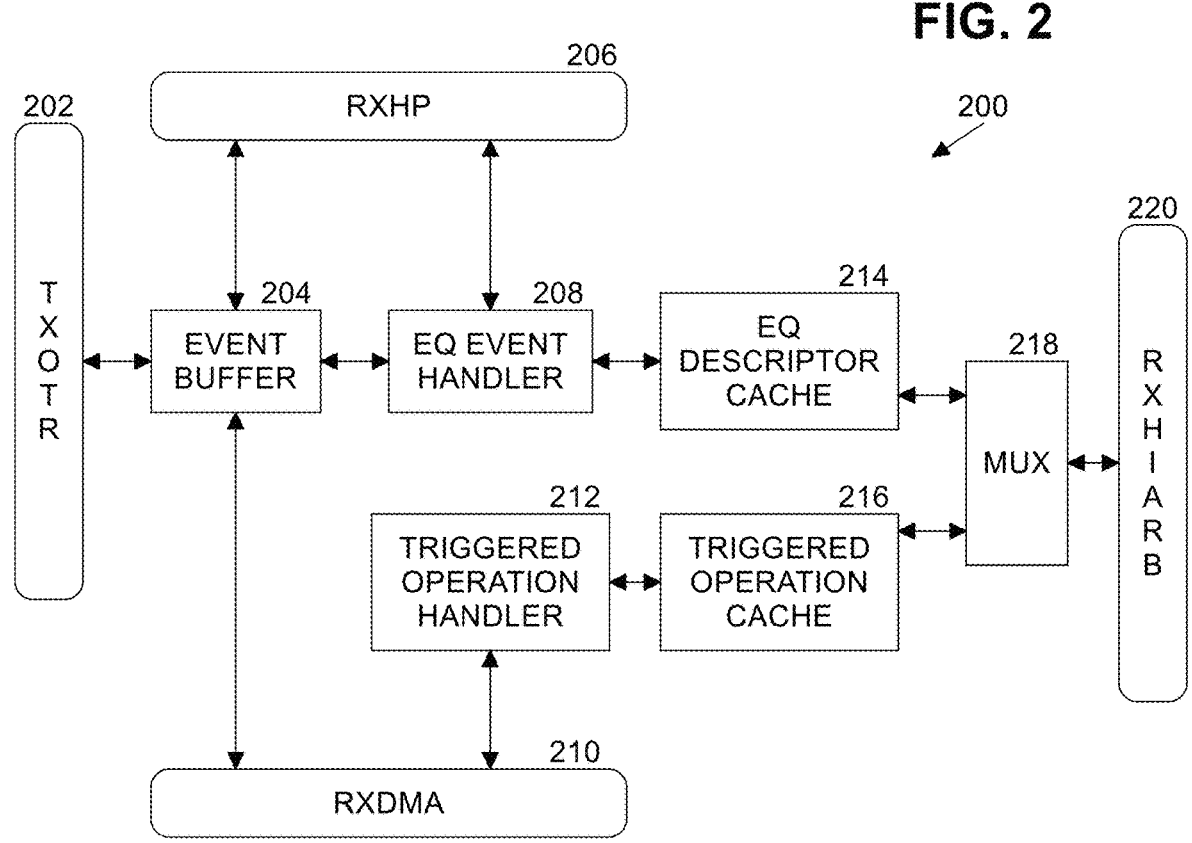
FIG. 2 illustrates a diagram of an I/O device according to an embodiment.

FIG. 2 illustrates a diagram of an I/O device 200 according to an embodiment. In an embodiment, I/O device 200 is a portion of network I/O device 110 configured to implement events and triggered operations. Receive host interface arbitration (RxHIArb) 220 is an interface that allows event logic (including event buffer 204, event queue (EQ) event handler 208, and EQ descriptor cache 214) to access host memory (e.g., primary memory 130). RxHIArb 220 is coupled with EQ descriptor cache 214 and a triggered operation cache 216 with 1K entries via multiplexor (MUX) 218. From the perspective of triggered operations, a purpose of RxHIArb 220 is to load TOs into triggered operations cache 216 on a miss or spill items out of triggered operations cache 216 on a capacity eviction. The receive header processing (RxHP) interface 206 connects the event logic to header processing logic (not shown). This enables the header processing logic to provide data about upcoming receive side events to the event logic. The transmit outstanding transactions and reliability (TxOTR) interface 202 is the analogous interface for transmit logic. The receive direct memory access (RxDMA) interface 210 provides information about message completion to the event logic. RxDMA 210 is the block that can determine when a receive side message has actually been written to host memory. RxDMA 210 then retrieves events from the event logic to write to the host and also informs the event logic when counters are incremented.

Event buffer 204 is related to "full events". Event buffer 204 stores information that will be written into host memory when a message completes. Full events are not directly related to triggered operations. EQ event handler 208 manages pointers in the Event Queue (EQ) (which holds full events). EQ descriptor cache 214 holds the pointers (head and tail) for full event queues. EQ descriptor cache 214 also holds information such as the size of those queues and control bits that impact the behavior of those queues.

Triggered operation handler 212 accepts an updated counter from RxDMA 210 and walks the list of triggered operations from triggered operation cache 216. When a triggered operation has a threshold that is met by the new count, the triggered operation is issued. In one embodiment, issuing that triggered operation means passing the triggered operation back to the RxDMA 210. RxDMA 210 has the appropriate interfaces to the transmit logic (not shown) and the receive logic (e.g., RxHP 206) to initiate new operations.

Some embodiments may advantageously utilize a Host Fabric Interface (HFI) hardware-based message scheduler in network I/O device 110 to improve or optimize collective operations for application 160. Any suitable hardware-based scheduler technology may be utilized for various embodiments. An example of suitable hardware-based scheduler technology may include technology compatible with the PORTALS Network Programming Interface specification (e.g., version 4.2, released November 2018). For example, some embodiments may utilize a combination of an online messaging profile-based optimization technology and a hardware scheduler's triggered operations (e.g., exposed via an industry standard interface such as OpenFabrics Interface (OFI) developed by the Open Fabrics Alliance). Advantageously, in some embodiments no software agent may be needed, thereby freeing all processors for computation purposes. Additionally, some embodiments may issue messages exactly in the priority order desired, and there is no need to recall any message, thereby decreasing communication latency for applications.

Generally, communication operations are scheduled to be executed by the HFI immediately upon submission by the application. Triggered communication operations allow the application to specify when the operation should be scheduled to execute based on a condition being met, for example, a threshold counter meeting or exceeding a specified threshold value. In an example of a basic technology for a triggered operation, when the value of a threshold counter reaches the specified threshold value, the operation executes. Upon completion of the operation, a separate completion counter may be incremented (e.g., if specified by the application). Triggered operations may be implemented in the HFI by a hardware-based scheduler. An API to access the triggered operations may be exposed via the OFI. Non-limiting examples of triggerable operations include Put (e.g., write), Get (e.g., read), Send, Receive, Atomic, and Counter Increment operations. The triggerable counter increment operation may allow incrementing a counter if another counter is incremented. Such linked counter operation may be particularly useful to allow an application to link multiple disjoint chains of triggered operations.

A triggered operation (TO) (e.g., a deferred data transfer request, triggered counter increment), initially stored in application space in primary memory 130 or storage devices 165 on computing platform 101, includes a communication operation, a triggering counter, and a threshold. A TO is pushed to network I/O device 110 when fabric library 162 adds the TO to the list of pending triggered operations. Network I/O device 110 stores the TO in triggered operation 416 cache and links the TO into an allocated list (described below). Other approaches are possible. In an embodiment, fabric library 162 could write the TO into primary memory 130 and then tell network I/O device 110 to add the TO to the allocate list without pushing the contents of the TO. In an embodiment, the push option is used to further the goal of having the TO cache "never miss". Thus, as long as the TO cache does not run out of capacity, the push approach is better. Unfortunately, multiple user level processes are typically concurrently using the network I/O device in a somewhat uncoordinated way; thus, it is hard for one process to know that another process has already mostly filled the cache (for example).

Counters have a single integer value and are incremented when communication events such as completion of a send operation or a receive operation occur. A TO 'fires' when its counter is equal to or greater than its threshold, initiating the communication operation of the TO by network I/O device 110. In turn, that communication operation upon completion may specify a counter to increment in another TO, which may cause more triggers to fire, and so on, forming a chain (or tree) of hardware-implemented triggered communication operations. Once initialized, triggers are managed by network I/O device 110, which checks for their threshold condition and fires them asynchronously without software involvement (e.g., without control by application 160 or fabric library 162).

Figure 3:
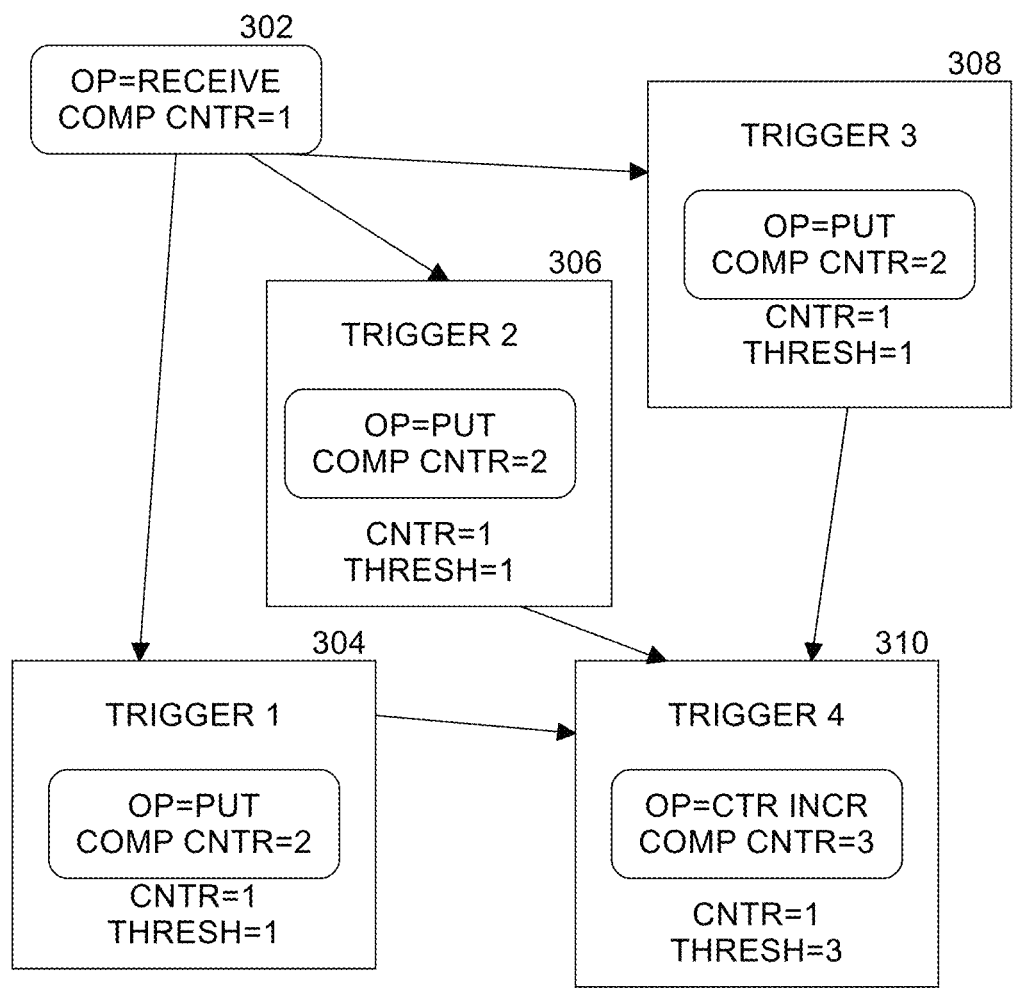
FIG. 3 illustrates an example communications operation.

FIG. 3 illustrates an example communications operation. In this example, communications operation 302 includes a "receive" operation with a completion counter (COMP CNTR) '1' that is incremented when the receive operation is complete. When counter 1 (CNTR) is incremented by the receive completion, this results in trigger 1 304, trigger 2 306, and trigger 3 308 firing because these triggers specify counter '1' and have their thresholds set to 1 (e.g., their counters are equal or greater than their thresholds). Each of these triggers performs a "put" operation. These three "put" operations specify the same completion counter 2, and trigger 4 310 depends on counter 2 as well. Since trigger 4 310 has a threshold of 3, trigger 4 310 fires when all three "put" operations from the prior triggers complete. The completion of trigger 4 310 results in counter 3 being incremented, which the application may read to determine that the entire chain of triggers has completed.

When a finite number of TOs are supported, fabric library 162 determines when triggers have fired so that they can be reused. There is no explicit notification back to fabric library 162 that a TO has fired in network I/O device 110. Fabric library 162 must individually inspect the state of each trigger. Furthermore, when a counter is equal to a trigger's threshold, fabric library 162 cannot be sure that the trigger has fired. Waiting for the counter to increment above the threshold cannot be relied upon, as this may never happen even in correct applications.

A triggered operation has "fired" when:
1) Its threshold has been reached;
2) Network I/O device 110 has identified this fact and walked the list of triggered operations to find the triggered operation that is ready to be initiated; and
3) When initiated, the triggered operation no longer needs a storage structure associated with the triggered operation (e.g., the TO may still need something associated with the operation itself, but the TO does not need the linked list state). In the case of the cache implementation, the storage structure is in the host memory (e.g., primary memory 130) that is stored in the triggered operation cache.

As noted above, in an embodiment network I/O device 110 includes a 1K entry triggered operation (TO) cache where active triggered operations (TOs) are stored for low latency issue when a threshold is reached. In an embodiment, the TO cache is 4-way set associative. The codesigned software approach of embodiments of the present invention provides an optimal result at this 1K entry TO cache size; increasing the size further does not show significant improvement in system efficiency. Limited space in the TO cache can instead be allocated to other features. The collective communications that rely most heavily on the latency reduction provided by the TO cache also tends to have smaller payloads (e.g., <4 KB), meaning that latency incurred by misses in the TO cache will not be hidden by the servicing of a large payload from primary memory 130. To promote efficient system operations, the TO cache should never (or very rarely) incur a cache miss during execution of a collective communication.

In an embodiment, TOs in the TO cache are referenced by a linked list managed by fabric library 162. The overwhelming access pattern to these lists is a single append operation to the tail of the TO linked list, and a single pop from the head of the TO linked list. These accesses and their corresponding list pointer updates ensure low temporal and spatial locality. As such, multiple reuse of TO linked list entries is not a primary objective of the present design, but rather ensures that a request that is appended to the TO linked list early in a collective communications flow will not be evicted before being accessed again for issuing, even if these two TO linked list accesses are separated by many cache accesses.

In an embodiment, network I/O device 110 ensures this behavior is by implementing a TO cache index hash function that maps TOs into the cache space sequentially. That is, if a series of TOs is written to the TO cache, the TOs will be placed in consecutive sets in the cache. The 1K TO cache can be filled before capacity evictions begin taking place. Thus, one motivation for embodiments of the present invention is to ensure that TOs are allocated in as close to a sequential manner as is possible. This will ensure the highest possible performance of the TO cache during HPC workloads that utilize it.

Figure 4:
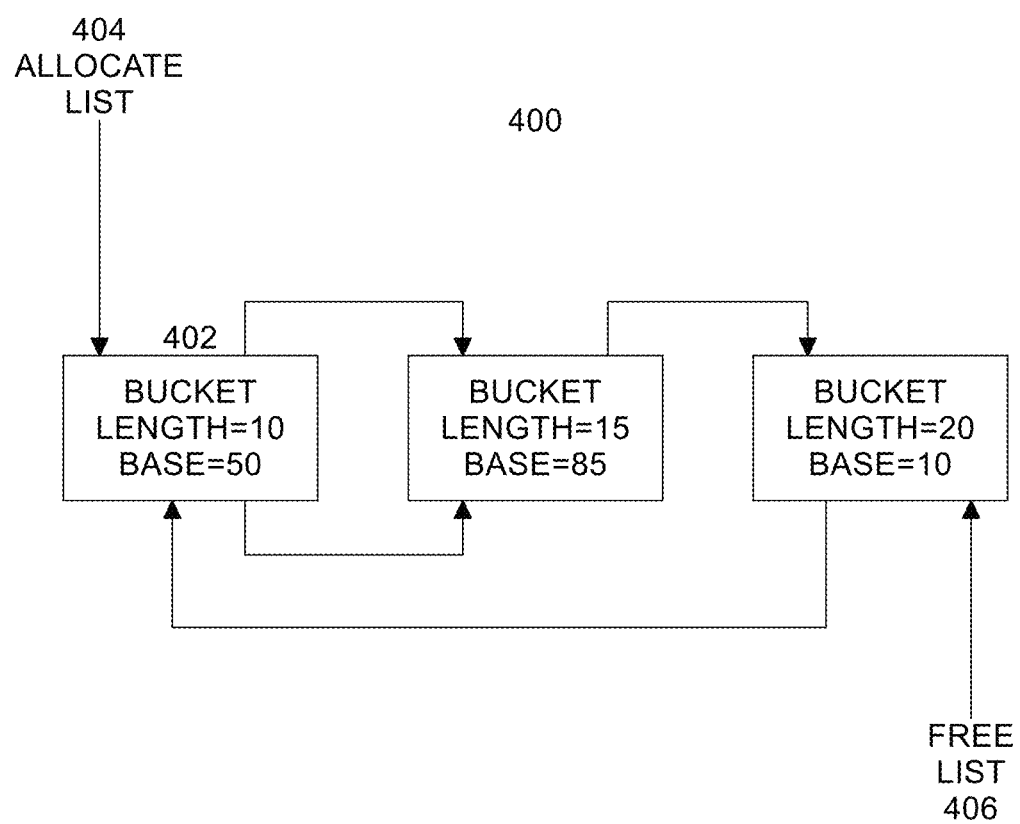
FIG. 4 illustrates an example list of buckets data structure according to an embodiment.

FIG. 4 illustrates an example list of buckets data structure 400 according to an embodiment. Unused triggers are maintained in one or more 'buckets.' A bucket 402 includes a base trigger slot number and a count of how many contiguous triggers are included in the bucket (e.g., the length of the trigger list). In software, the base trigger slot number is a unique integer identifying a specific trigger (e.g., an array index). Due to the hardware cache design as described above, the base trigger slot number also indicates a position in the TO cache. Initially there is one bucket containing all available triggers. Two linked lists are maintained by fabric library 162, with each list referencing the same set of buckets, but the lists are sorted by different criteria. The allocate list 404, containing buckets allocated for use, is sorted by the number of triggers in each bucket in ascending order (e.g., smallest first). The free list 406, containing buckets available to be allocated, is sorted by the base trigger slot number (e.g., smallest first).

Figure 5:
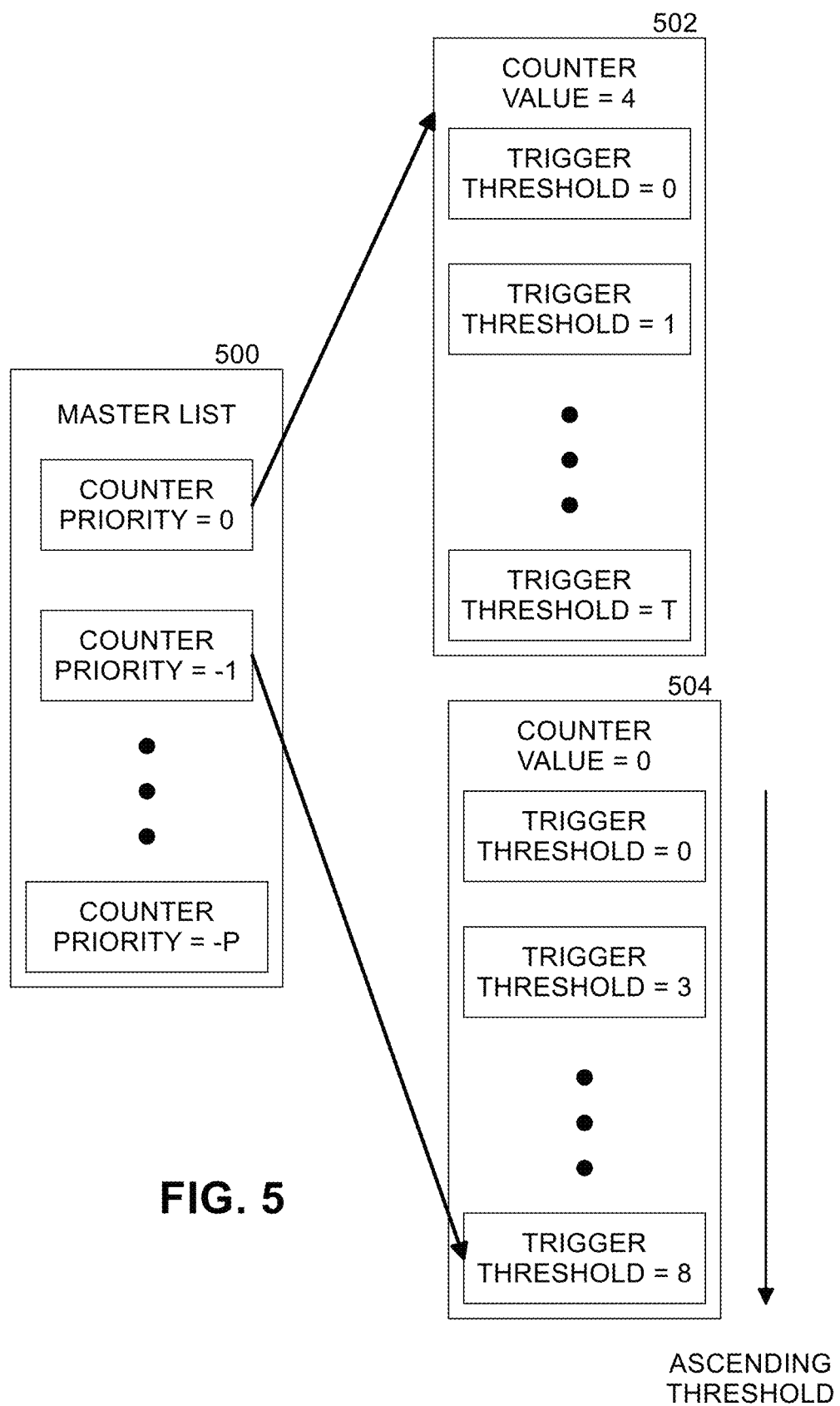
FIG. 5 illustrates an example master list of counters and associated lists of triggers according to an embodiment.

FIG. 5 illustrates an example master list of counters and associated lists of triggers according to an embodiment. When insufficient free triggers are available, the state of previously armed triggers is inspected to determine which ones (if any) have fired and can be reused. This state consists of a master list of counters 500 with active triggers. In an embodiment, master list 500 is prioritized according to a heuristic that favors counters with more dependent triggers firing. For each counter, a list of active triggers 502, 504 dependent upon that counter is maintained. In an embodiment, the trigger lists 502, 504 in each counter are ordered by ascending threshold, since this is the order in which they will fire. A process looking for fired triggers can stop traversing a counter's active trigger list once a trigger with a threshold greater than the counter's value is observed, because it is not possible that any of the remaining triggers in the ascending list have fired.

Figure 6:
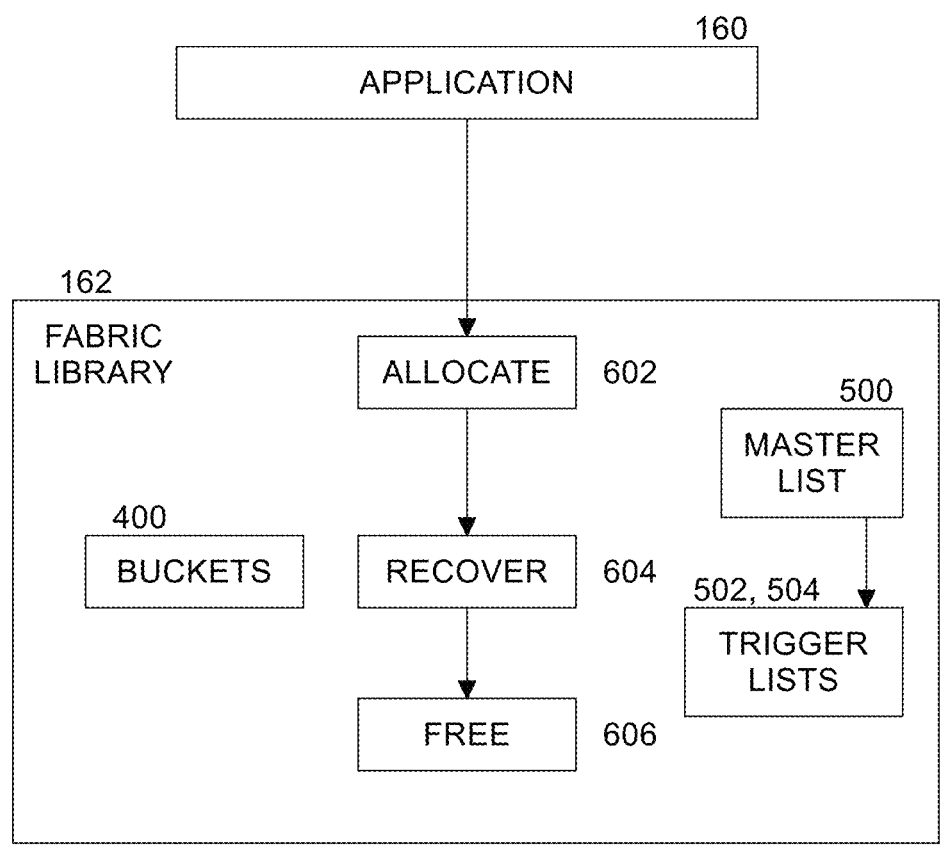
FIG. 6 illustrates functions provided by a fabric library in one embodiment.

FIG. 6 illustrates functions provided by fabric library 162 in one embodiment. The set of functions includes: Allocate 602, Free 606, and Recover 604. The Allocate function 602 is invoked when application 160 requests one or more triggers. When a trigger is allocated, the trigger is removed from a bucket in allocate list 404 and free list 406, then added to a counter's trigger list 502 or 504. If that counter's trigger list was previously empty, it is added to master counter list 500. If performance of the Allocate function by fabric library 162 does not find any new triggers, the Recover function 604 is invoked by Allocate function 602. The Recover function invokes the Free function 606 on each completed trigger the fabric library recovers. The Free function updates allocate list 404 and free list 406 state used by the Allocate function to find triggers. The Free function also removes the trigger from its counter's trigger list 502 or 504 and removes the counter from master list 500 if no triggers remain for that counter. In an embodiment, when the Recover function completes, the Allocate function again attempts to find a set of triggers to implement the application's request. In an embodiment, fabric library 162 also includes master list 500, trigger lists (e.g., allocate list 502, free list 504), and buckets 400.

Figure 7:
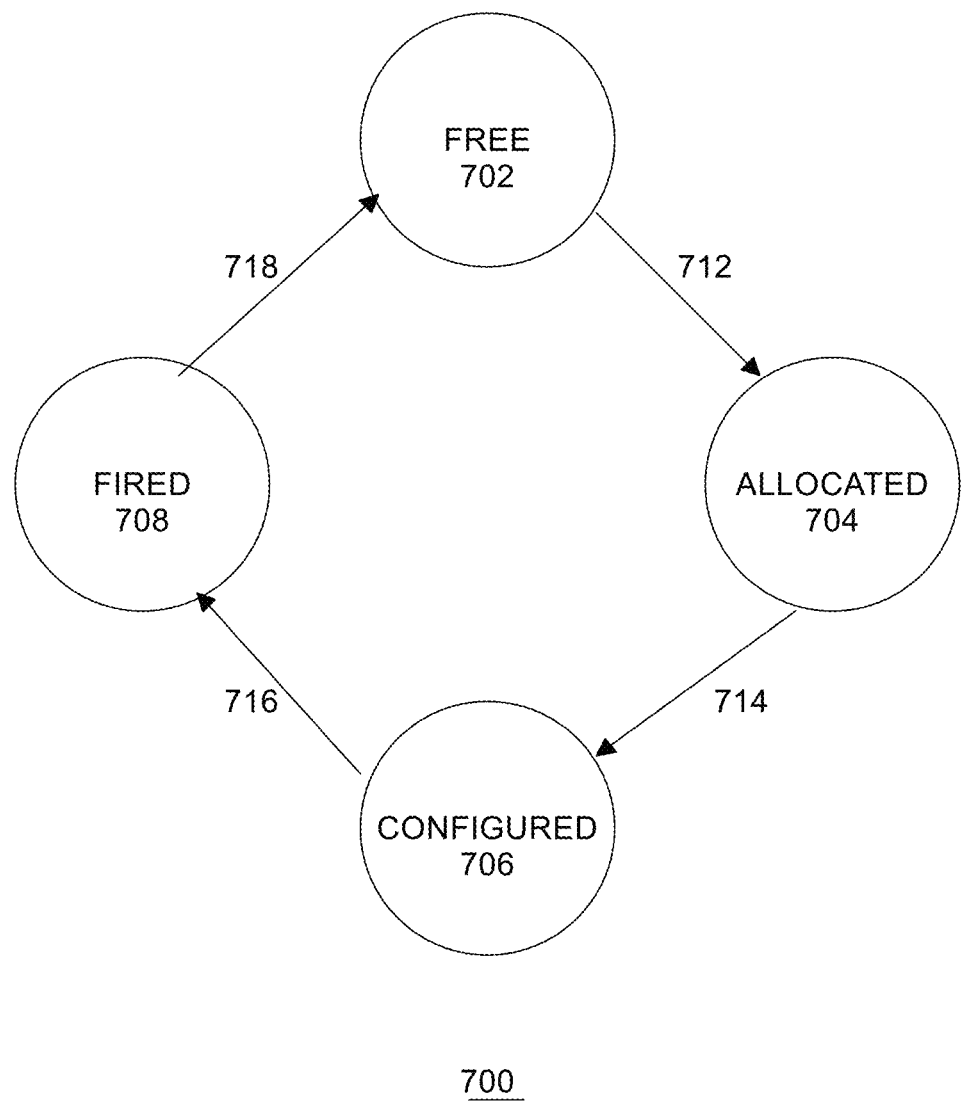
FIG. 7 illustrates trigger state transitions according to an embodiment.

FIG. 7 illustrates trigger state transitions 700 according to an embodiment. Initially, a trigger is in a free state 702. Application 160 invokes the Allocate function 602 of fabric library 162 to obtain triggers. The trigger transitions 712 to the allocated state 704. Application 160 defines trigger parameters and stores the trigger operation in the TO cache in I/O device 200. The trigger transitions 714 to configured state 706. I/O device 200 monitors the trigger's conditions and initiates communications when the trigger's conditions are met. Firing of the trigger results in the trigger transitioning 716 to fired state 708. As various counters are incremented by I/O device 200, I/O device 200 checks for triggers that have met the threshold and fires them. Fabric library 162 observes that a trigger has fired when the trigger threshold is less than or equal to the counter value, with the help of a 'trigger fence' operation described below. Fabric library 162 invokes the Recover function 604 to analyze the trigger counter and state to reuse the trigger. The trigger then transitions 718 back to free state 702.

Figure 8:
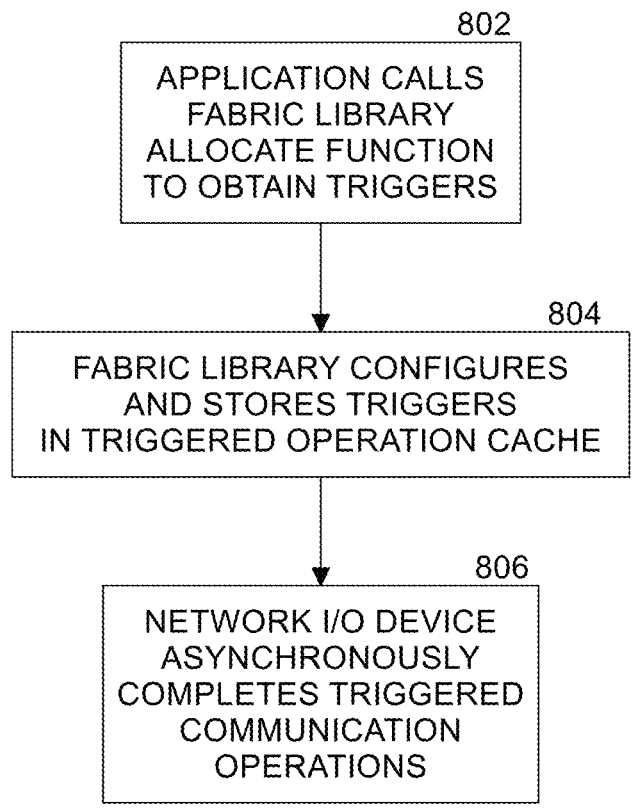
FIG. 8 illustrates a flow diagram of an example fabric library.

FIG. 8 illustrates a flow diagram 800 of a fabric library according to an embodiment. At block 802, application 160 calls the Allocate function 602 in fabric library 162 to obtain one or more triggers. At block 84, fabric library 162 configures the one or more triggers and stores the one or more triggers in the TO cache for subsequent execution by network I/O device 110. At block 806, I/O device 200 asynchronously completes triggered communication operations for the one or more triggers (e.g., the triggers fire when their conditions are met) stored in the TO cache.

Shown below are example pseudocode implementations of the Allocate 602, Recover 604, and Free 606 functions.

```
© 2019 Intel Corporation
bucket allocate (count, retry)
for each bucket in allocate_list
    if bucket > count > count
        result = new bucket (bucket -> base, count)
        bucket -> base += count
        bucket -> count -= count
    while bucket -> count < bucket -> prev -> count
        swap_buckets (bucket, bucket -> prev, allocate_list)
    while bucket-> base < bucket -> prev -> base
        swap_buckets (bucket, bucket -> prev, free_list)
    return result
    else if bucket -> count == count
        remove_from_lists (bucket)
        return bucket
if (retry)
    recover ( )
    return allocate (count, false)
return NULL // No triggers currently available
```

The Allocate function 602 iterates over the buckets in order from smallest to largest and uses triggers from the first sufficiently large bucket. That now-smaller bucket is then 'bubbled' towards the head of the free list 406 and the allocate list 404 to preserve their sorted order. If there are no free triggers, the Recover function 604 is invoked.

```
© 2019 Intel Corporation
void recover (void)
    for each counter in master_list
        cur_val = counter -> value
        if counter -> next_threshold >= cur_val
            continue
        trigger_fence (counter, cur_val)
        for each trigger in counter -> trigger_list
            if trigger -> threshold > counter -> value
                break
            free (trigger)
            counter -> active--
            if counter->active == 0
                remove (master_list, counter)
                break
```

A trigger fence operation is performed when a counter with potentially fired triggers is encountered. The fence ensures that all triggers depending on this counter with a threshold less than or equal to the counter's value have fired. The implementation of the trigger_fence operation may vary depending on I/O device 200. When trigger_fence completes, all triggers depending on that counter with a threshold less than or equal to the given value have completed. In one embodiment, two triggered operations are executed to ensure both transmit (TX) and receive (RX) triggered operations have completed. For TX, a triggered zero-length put operation to self is used. For RX, a triggered counter increment is used. For both, the current counter is used as the triggering counter and the current counter's current value as the threshold. Since the threshold is already met, these triggered operations should fire and complete quickly. The TX operation is detected complete when the put operation completes, and the RX when the result counter is incremented. Finally, those triggers are freed, returning them to a bucket.

```
© 2019 Intel Corporation
void combine_buckets (bucket)
    Next = bucket -> next
    if bucket -> base + bucket -> count == next -> base
        bucket -> count += next -> count
        remove_from_lists (next)
void free (trigger)
    for each bucket in free_list
        if bucket -> base > trigger -> index
            if bucket -> prev -> base + bucket -> prev -> count ==
              trigger -> index - 1
                bucket -> prev -> count++
                combine_buckets (bucket -> prev)
            else if bucket -> base == trigger -> index + 1
                bucket -> base --
                bucket -> count++
                combine_buckets (bucket)
            else
                temp = new_bucket (trigger -> index, 1)
                insert_before (temp, bucket, free_list)
                insert_head (temp, allocate_list)
            return
    temp = new bucket (trigger -> index, 1)
    insert_tail (temp, free_list)
    insert_head (temp, allocate_list)
```

Several functions referenced above represent common/simple double-linked list operations and are omitted here for brevity: swap_buckets, insert_before, insert_head, insert_tail, and remove_from_lists.

The Free function 606 iterates over the buckets ordered by trigger index trying to place the free trigger at the right place in the sequence. There are three possibilities: (1) the trigger is immediately after the end of a bucket, so increment that bucket's count, (2) the trigger immediately precedes a bucket, so decrement that bucket's base and increment its count, or (3) the trigger is not adjacent to any buckets, so create a new bucket. Cases (1) and (2) can result in the gap between two buckets disappearing; when that occurs the two buckets are joined into one.

Optimizations to the above garbage collection are possible. For example, the trigger fence operation can be split into start and completion phases. Triggered fence can be started for many different counters simultaneously, followed by a single wait for completion of all triggered fences. Then the completed triggered operations can be cleaned up. An advantage of this approach is that many triggered fence operations can be overlapped, reducing time spent in garbage collection. Other optimization strategies involve reordering or prioritizing the master list 500 to visit counters most likely to have fired triggers first.

Figure 9:
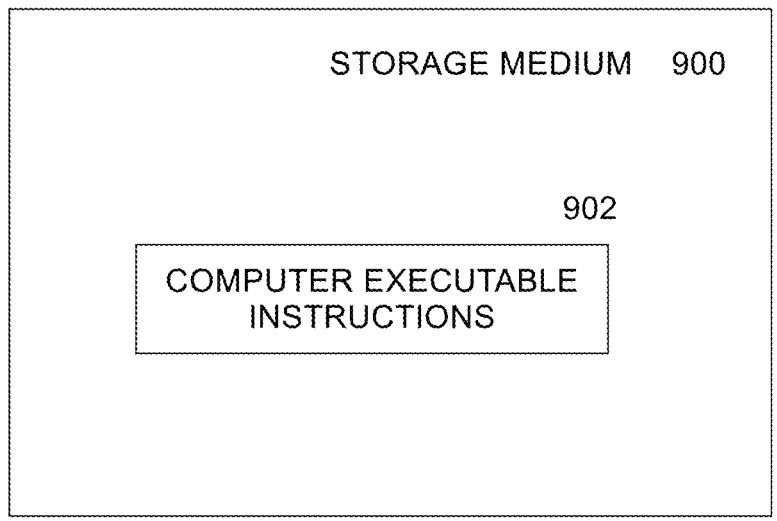
FIG. 9 illustrates an example of a storage medium.

FIG. 9 illustrates an example of a storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions 902 to implement logic flows described above. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
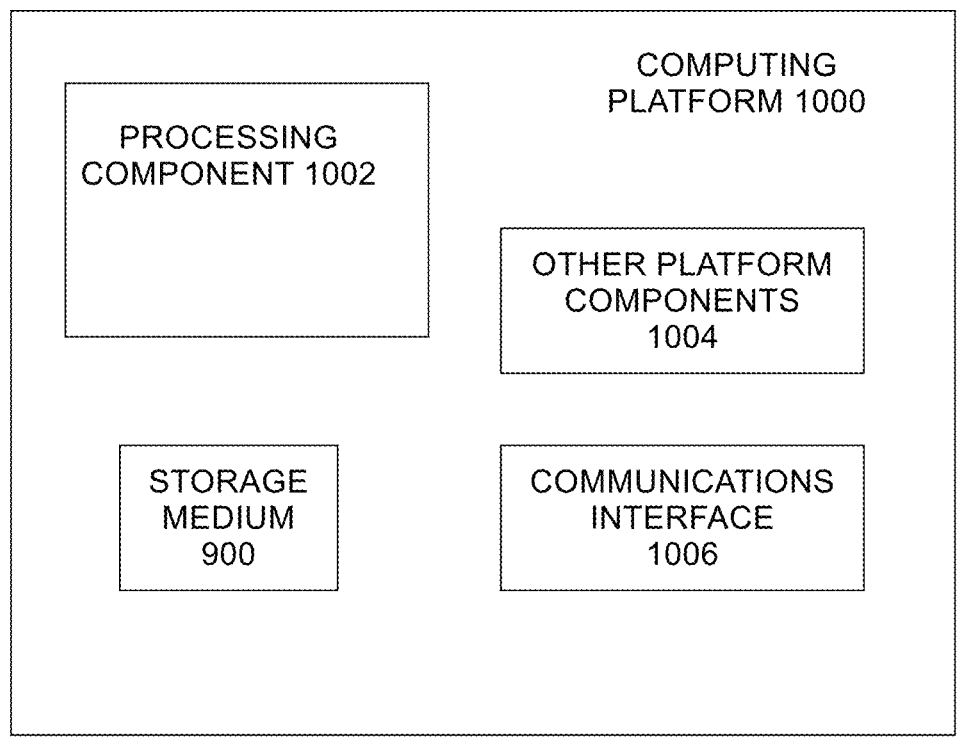
FIG. 10 illustrates another example computing platform.

FIG. 10 illustrates an example computing platform 1000. In some examples, as shown in FIG. 10, computing platform 1000 may include a processing component 1002, other platform components 1004 and/or a communications interface 1006.

According to some examples, processing component 1002 may execute processing operations or logic for instructions stored on storage medium 900. Processing component 1002 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1004 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D crosspoint memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1006 may include logic and/or features to support a communication interface. For these examples, communications interface 1006 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 1000, including logic represented by the instructions stored on storage medium 900 may be implemented using any combination of discrete circuitry, ASICs, logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first, " "second," "third," and so forth, are used merely as labels, and are not intended to impose numerical requirements on their objects.

What is claimed is:

1. A method comprising:
   receiving a request to allocate a triggered operation;
   if there is a free triggered operation, allocating the free triggered operation;
   if there is no free triggered operation, recovering one or more fired triggered operations, freeing one or more of the recovered triggered operations, and allocating one of the freed triggered operations;
   configuring the allocated triggered operation; and
   storing the configured triggered operation in a cache on an input/output (I/O) device for subsequent asynchronous execution of the configured triggered operation.

2. The method of claim 1, wherein the triggered operation comprises a data transfer request having execution deferred by the I/O device until at least one condition is met.

3. The method of claim 2, wherein the at least one condition comprises a counter of the triggered operation being equal to or greater than a threshold of the triggered operation.

4. The method of claim 3, wherein recovering one or more fired triggered operations comprises analyzing the counter and a state of each of the one or more fired trigger operations.

5. The method of claim 4, wherein the state comprises free, allocated, configured, or fire.

6. The method of claim 5, wherein configuring an allocated triggered operation comprises setting the state of the triggered operation to configured.

7. The method of claim 5, wherein freeing the one or more recovered triggered operations comprises setting the state of each of the one or more recovered triggered operations to free, adding the triggered operation to a free list, and removing the triggered operation from an allocated list.

8. The method of claim 5, wherein allocating a triggered operation comprises setting the state of the triggered operation to allocated, adding the triggered operation to an allocated list and removing the triggered operation from a free list.

9. At least one tangible machine-readable medium comprising a plurality of instructions that in response to being executed by a processor cause the processor to:
   receive a request to allocate a triggered operation;
   if there is a free triggered operation, allocate the free triggered operation;
   if there is no free triggered operation, recover one or more fired triggered operations, free one or more of the recovered triggered operations, and allocate one of the freed triggered operations;
   configure the allocated triggered operation; and
   store the configured triggered operation in a cache on an input/output (I/O) device for subsequent asynchronous execution of the configured triggered operation.

10. The at least one tangible machine-readable medium of claim 9, wherein the triggered operation comprises a data transfer request having execution deferred by the I/O device until at least one condition is met.

11. The at least one tangible machine-readable medium of claim 10, wherein the at least one condition comprises a counter of the triggered operation being equal to or greater than a threshold of the triggered operation.

12. The at least one tangible machine-readable medium of claim 11, wherein instructions to recover one or more fired triggered operations comprise instructions to analyze the counter and a state of each of the one or more fired trigger operations.

13. The at least one tangible machine-readable medium of claim 12, wherein the state comprises free, allocated, configured, or fire.

14. The at least one tangible machine-readable medium of claim 13, wherein instructions to configure an allocated triggered operation comprise instructions to set the state of the triggered operation to configured.

15. The at least one tangible machine-readable medium of claim 13, wherein instructions to free the one or more recovered triggered operations comprise instructions to set the state of each of the one or more recovered triggered operations to free, add the triggered operation to a free list, and remove the triggered operation from an allocated list.

16. The at least one tangible machine-readable medium of claim 13, wherein instructions to allocate a triggered operation comprise instructions to set the state of the triggered operation to allocated, add the triggered operation to an allocated list and remove the triggered operation from a free list.

17. An apparatus comprising:
   an input/output (I/O) device including a triggered operation cache;
   a processing device; and
   a memory device coupled to the processing device, the memory device having instructions stored thereon that, in response to execution by the processing device, cause the processing device to:

receive a request to allocate a triggered operation;

if there is a free triggered operation, allocate the free triggered operation;

if there is no free triggered operation, recover one or more fired triggered operations, free one or more of the recovered triggered operations, and allocate one of the freed triggered operations;

configure the allocated triggered operation; and store the configured triggered operation in the triggered operation cache on the I/O device;

wherein the I/O device is to subsequently execute the configured triggered operation asynchronously with the storage of the configured triggered operation.

18. The apparatus of claim 17, wherein the triggered operation comprises a data transfer request having execution deferred by the I/O device until at least one condition is met.

19. The apparatus of claim 18, wherein the at least one condition comprises a counter of the triggered operation being equal to or greater than a threshold of the triggered operation.

20. The apparatus of claim 19, wherein instructions to recover one or more fired triggered operations comprise instructions to analyze the counter and a state of each of the one or more fired trigger operations.

21. The apparatus of claim 17, the I/O device to store triggered operations into the cache sequentially.

* * * * *